March 15, 1932. F. PORSCHE 1,849,113
VACUUM OPERATED BRAKE SYSTEM
Filed Jan. 11, 1929  3 Sheets-Sheet 1

Inventor:
FERDINAND PORSCHE
By
Attorneys

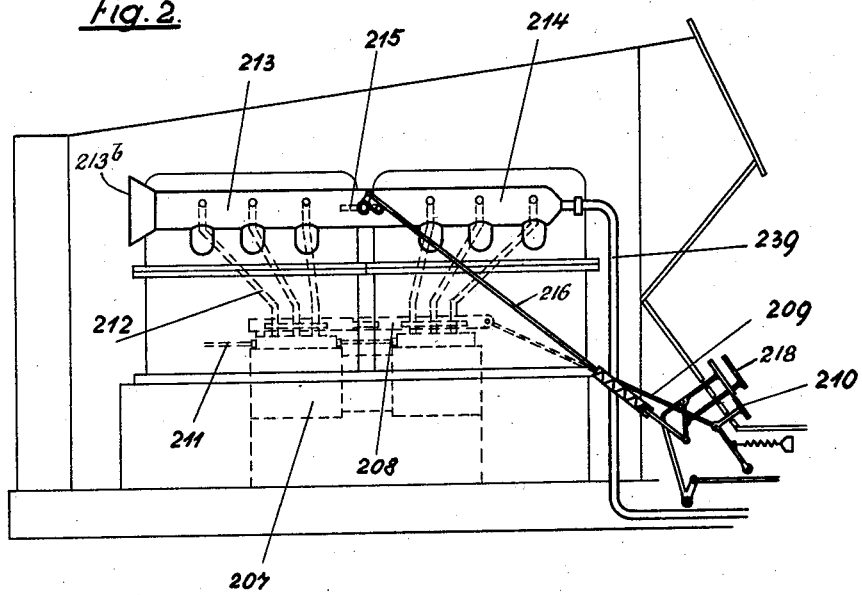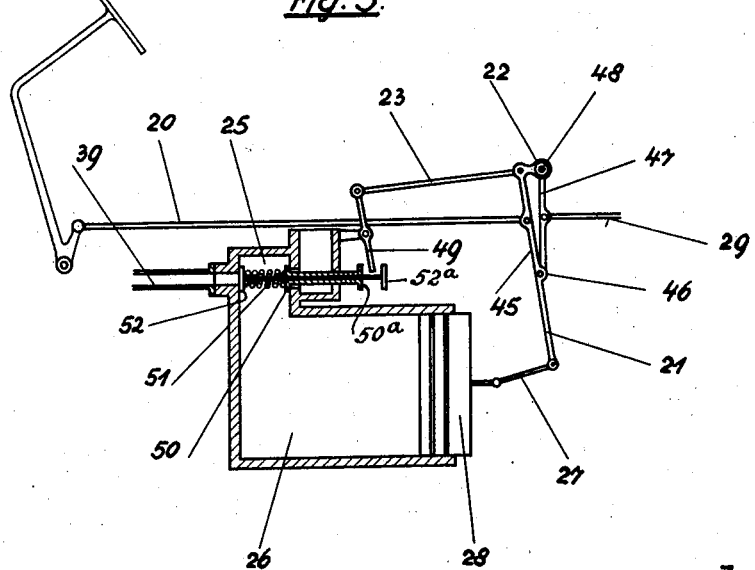

Patented Mar. 15, 1932

1,849,113

UNITED STATES PATENT OFFICE

FERDINAND PORSCHE, OF STUTTGART-UNTERTURKHEIM, GERMANY, ASSIGNOR TO DAIMLER-BENZ AKTIENGESELLSCHAFT, OF STUTTGART-UNTERTURKHEIM, GERMANY, A CORPORATION OF GERMANY

VACUUM-OPERATED BRAKE SYSTEM

Application filed January 11, 1929, Serial No. 331,850, and in Germany March 26, 1928.

The present invention relates to an improvement in vacuum-operated brake systems for vehicles driven by crude oil engines.

In power driven vehicles equipped with crude oil engines and vacuum operated brake systems the engines are liable to develop smoke when the brakes are operated, such smoke being caused by the insufficiency of air supplied to the cylinders.

The object of the present invention is to remove this defect. This object is attained by connecting less than all of the cylinders with the vacuum cylinders of the brake during the braking operations, and cutting off the fuel supply to the cylinders so connected, without disconnecting the fuel supply for the remaining cylinders.

Two modifications of the invention are shown by way of illustration, but not by way of limitation, in the accompanying drawings in which—

Fig. 2 shows a modification of the structure shown in Fig. 1, which modification relates to the control of the air supply to the engine slightly in advance of and during the braking operation.

Fig. 5 is an enlarged diagrammatic view of the brake cylinder and associated link mechanism shown in Figs. 1 and 2.

Figure 1:
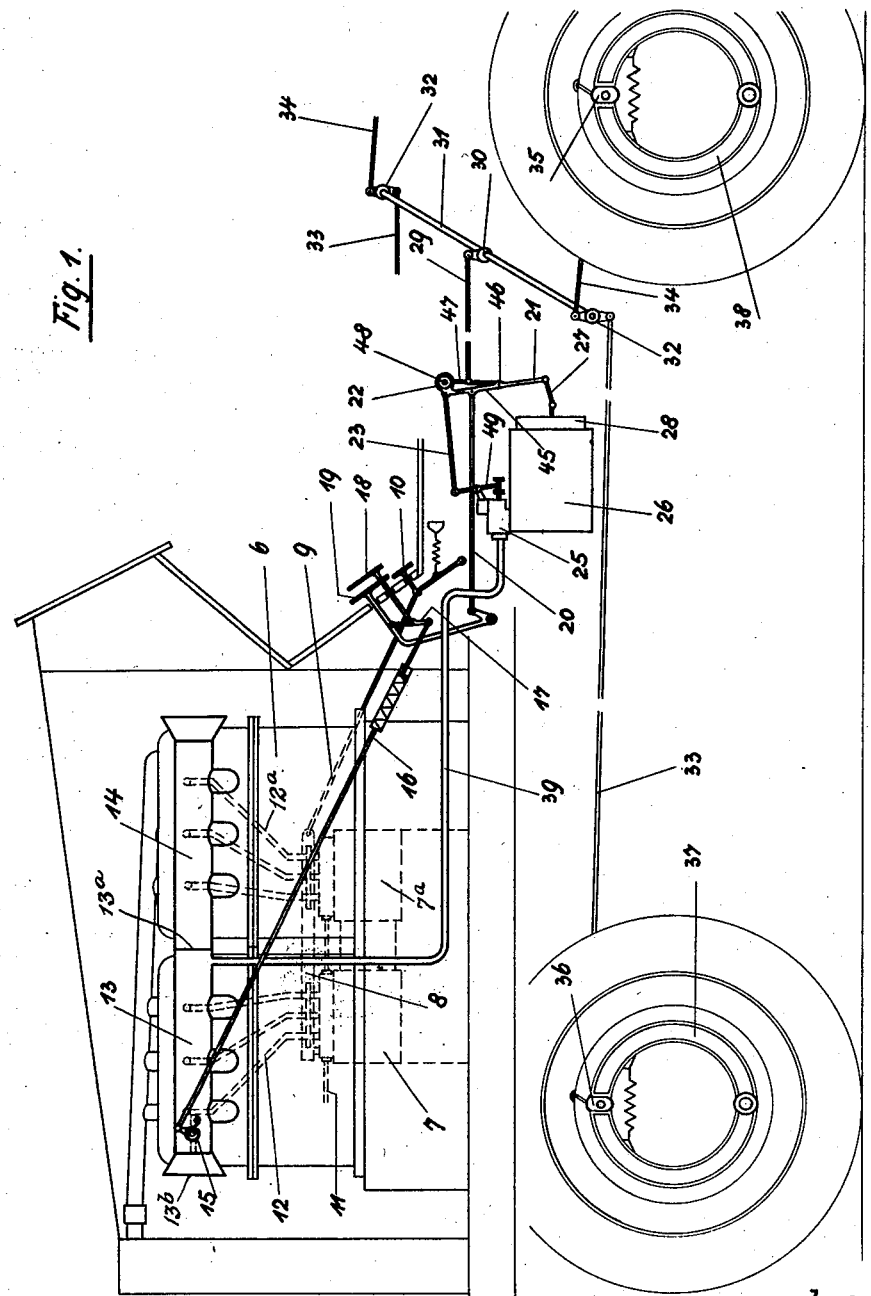
Fig. 1 is a diagrammatic view of an automotive vehicle equipped with a multiple cylinder crude oil engine, a vacuum brake system, and a connection between the latter and some of the cylinders of the engine and means for enabling the driver to shut off the fuel supply to such cylinders.

In the embodiment shown in Fig. 1, 6 represents a six-cylinder crude oil (Diesel) engine provided with the usual associated fuel pumps 7—7ª and their associated conduits 12—12ª, each for supplying fuel to one cylinder. 11 is a conduit for supplying fuel to the pumps. The suction manifold consists of two suction conduits 13, 14 separated by a dividing wall 13ª so that the three cylinders of the left-hand group are supplied with air through the conduits 13 and the three cylinders of the right-hand group are supplied with air through the conduit 14 and neither group can be supplied with air by the conduit associated with the other group. 15 is a throttle or butterfly valve by means of which the conduit 13 may be closed so that no air can reach the cylinders through the usual intake opening 13ᵇ of such conduit. This valve is operated through the instrumentality of rod 16 and may be closed by stepping on pedal 18 and opened by releasing the pedal.

The interior of the conduit 13 is connected by means of conduit 39 to the brake-cylinder 26 provided with piston 28. Valve 52 (see Fig. 5) provided with spring 51 and arranged in valve housing 25 serves normally to close the connection between conduit 13 and the brake-cylinder 26 through conduit 39, but when open, and especially when valve 15 is closed, permits the left-hand group of engine units to draw air from the brake-cylinder and thus cause the brake piston to move further into the interior of the brake-cylinder.

Valve 50 is normally held closed by spring 51 and may have a hollow valve stem sliding on the stem of valve 52. Valves 50 and 52 are provided with abutment heads 50ª and 52ª respectively by means of which the valves can be actuated by lever 49 which, when pressing against head 52ª opens valve 52, and when pressing against head 50ª opens valve 50. Under normal running operations the lever 49 presses against head 50ª, thus opening valve 50 so that both sides of piston 28 are exposed to the atmosphere, but during the braking operation, the lever 49 presses against head 52ª, thus opening valve 52 and establishing connection, via conduit 39, between conduit 13 and brake cylinder 26 so that, as already stated, the engine units of the left-hand group tend to create a vacuum in the brake cylinder, especially when valve 15 is closed.

The pumps 7 and 7ª are provided with means by which, during ordinary running operation, the fuel supply to all of the cylinders may be regulated but during the braking operation the fuel supply may be entirely shut off from such of the cylinders as are connected with the brake cylinder, i. e. the left-hand group of cylinders. In the modification shown in Fig. 1 the valves controlling the conduits 12, 12ª are operated by means of a rack 8 connected with accelerator pedal 10 in any suitable manner, for instance, such that when the accelerator pedal is released the valves will entirely close the connection between pump 7 and the left-hand group of cylinders, while the valves connecting pump 7ª with the right-hand group of cylinders will permit enough fuel to be fed to permit the engine to run idle, or the arrangement may be of the nature illustrated in Figs. 3 and 4 which as illustrated is arranged for use in connection with the modification shown in Fig. 2.

From the above it will be evident that the modification shown in Fig. 1 is intended to operate, broadly speaking, as follows during the braking operation:

The valve 15 is closed and the valve 52 is opened so that the left-hand group of engine units will draw air from the brake cylinder, thus permitting pressure of the atmosphere to retract the brake piston 28, while the fuel supply is shut off from the group of engine cylinders connected with the brake cylinders, thus preventing incomplete combustion of fuel. At the same time the remaining engine units are fed with enough fuel to keep the engine running idle. When the brakes are released the valves 15 and 50 are opened and the valve 52 closed, the engine continuing to run idle until the driver again steps on the accelerator pedal.

The link system by which the modification shown in Fig. 1 is operated, is the following:

Pedal 18 is connected by means of its pedal rod to lever 17 which, in turn, is connected with rod 16. In the manner already described the depressing of the pedal 18 causes valve 15 to close, thus causing the left-hand group of engine units to begin to draw air through conduit 39 and thus to create a partial vacuum in such conduit 39. When the pedal 18 is depressed until it reaches brake pedal 19, additional pressure given by the driver's foot causes the depression of pedal 19 and its associated pedal rod, thus causing such rod to exert a forward pull on rod 20, and thereby causing a forward pull on lever 45/21 fulcrumed at 46. The upper end of lever 45/21 swings forwardly, thus pushing link 23 forwardly and the lower portion of lever 49 backwardly, thereby opening valve 52 against the pressure of spring 51. The upper end of lever 45/21 is attached by means of an eye 22 to fixed pin 48, the fit between such pin and eye being so loose as to permit the described movement of levers 23 and 49. By this operation connection is established between the left-hand group of engine cylinders and the brake cylinder through conduit 39, and as valve 15 has already been closed, air is withdrawn from the brake cylinder, and the brake piston is caused to move inwardly. The presence of a partial vacuum in conduit 39 and conduit 13 accelerates the braking action. At the same time, the accelerator pedal 10 having been released by the driver, all supply of fuel has been shut off from the left-hand group of engine cylinders while enough fuel is still being fed to the right-hand group of engine cylinders to permit the engine to run idle.

The brake piston 28 is attached by means of link 27 to lever 45/21 and pulls the lower end of such lever forwardly, thus pulling forwardly on the lower end of link 47 which is pivotally attached to such lever at 46, the upper end of such link being fulcrumed about pin 22. This movement of link 47 causes a forward pull on link 29 which is connected by means of arm 30 to brake shaft 31. The resulting rotation of such shaft 31 sets brakes 37, 38 by means of the usual brake-setting mechanism such as arms 32, links 33 and 34, and brake toggles 35 and 36.

In the modification shown in Fig. 2, the suction conduit 213—214 supplies all of the cylinders with air which passes into such conduit through opening 213ᵇ. The conduit is provided at its center with a throttle or butterfly valve 215 which is operated from pedal 218 by means of link 216. The only substantial difference between the modification shown in Fig. 2 and that shown in Fig. 1, is that in the former the valve 215 when closed divides the conduit into two parts 213 and 214 and shuts off one of such parts (214) from immediate access to the open air, thus performing the function performed in the modification of Fig. 1 by the wall 13ª and the valve 15.

Figure 3:
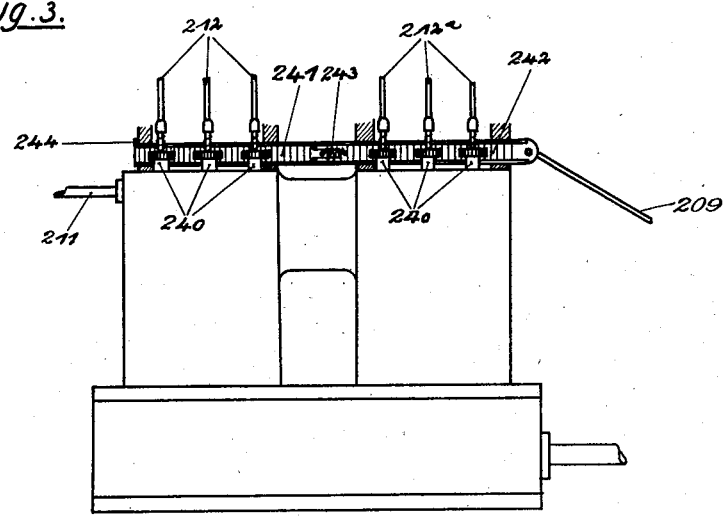
Fig. 3 represents on a somewhat enlarged scale, and by a front elevation partially in section, the mechanism for regulating the fuel supply during the braking operation, the parts being shown in their position prior to the commencement of the braking operation.
Figure 4:
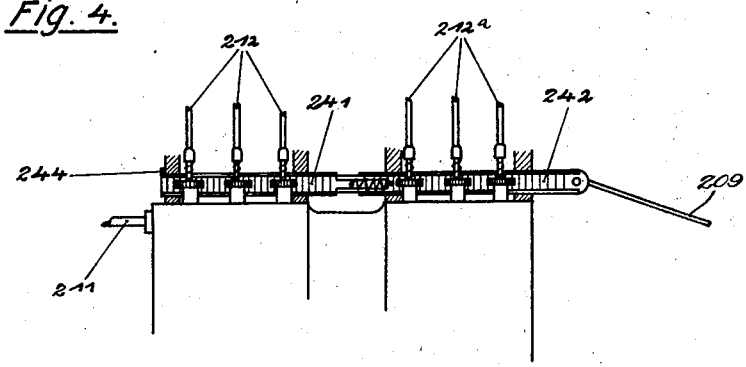
Fig. 4 is a view similar to that shown in Fig. 3 in which the parts are shown in the position which they assume during the braking operation.

As in the modification shown in Fig. 2 the right-hand group of engine units is connected with the brake cylinder, and the left-hand group of engine units must therefore keep the engine running, the fuel supply to the former group is shut off. The mechanism for doing this is illustrated in Figs. 3 and 4, in which 212 indicates conduits through which fuel is pumped to the left-hand group of engine cylinders and 212ª the conduits through which fuel is pumped to the right-hand group of engine cylinders, which latter are to have their fuel supply cut off entirely during the braking operation. 211 is the conduit through which fuel is supplied to the pumps, and 209 the connection to the accelerator pedal. 240, 240 are gear wheels for operating the rotary slide valves (not shown) controlling the fuel conduits. These gear wheels mesh with a rack composed of two parts, 241 and 242, united by a strong spring 243, slidably mounted and provided at one end with an abutment 244 and connected at the other end with the accelerator rod 209. When pressure is applied to the accelerator pedal the rod 209 exerts pressure on the righthand end of portion 242 and this, in turn, exerts pressure on section 241, thus causing the rack to open the fuel supply valves through the medium of gear wheels 240, in accordance with the distance to which the accelerator pedal is depressed. When the accelerator pedal is entirely released, the link 209 exerts a pull on rack 241/242. When the fuel supply passing through conduits 212 has been cut down to the desired extent, the abutment 244 will come in contact with a suitable stop thus preventing further closing movement on the part of portion 241. The strength of spring 243 is such that further movement of portion 242 is possible until the valves controlling conduits 212ª have been completely closed.

Claims:

1. In a vehicle, the combination comprising a multi-cylinder crude oil engine having an intake manifold the interior of which is divided into two separate spaces, a valve in one of said spaces and operable to seal the same, a vacuum-operated brake system adapted to be placed in communication with the last mentioned space, means for supplying fuel to the cylinders of the engine, a brake operating pedal, a lever having its one end connected to said pedal and having its other end operatively connected to said valve, and a foot member arranged over said pedal and connected with said lever, whereby said pedal cannot be depressed until said foot member has been pressed thereupon and has closed said valve.

2. The combination set forth in claim 1 in conjunction with means to interrupt the fuel supply to the engine cylinders communicating with the space last referred to.

3. In a vehicle, the combination of a crude oil engine of the multi-cylinder type, a vacuum-operated brake system, means for temporarily connecting the same with certain of the cylinders for effecting evacuation of the brake system by the engine, a fuel pump for supplying fuel to the cylinders, and a regulating mechanism for said pump, including two movable elements yieldingly connected with each other, one of said elements operative to control the fuel supply from one part of the pump to the cylinders which do not evacuate the brake system, the other element operative to control the fuel supply from the other part of the pump to the cylinders which evacuate the brake system, and means for limiting the stroke of the first of said elements in a position in which sufficient fuel is fed to the motor to keep it idling, the second of said elements being adapted to interrupt the the fuel supply from the associated part of the pump.

4. In a vehicle, the combination of a crude oil engine of the multi-cylinder type, a vacuum-operated brake system, means for temporarily connecting the same with certain of the cylinders for effecting evacuation of the brake system by the engine, a fuel pump for supplying fuel to the cylinders, and a regulating mechanism for said pump, comprising two spring-connected racks, one of which controls the fuel supply from one section of the pump to the cylinders which evacuate the brake system, and the other of which controls the fuel supply from the other section of the pump to the cylinders which do not evacuate the brake system, means for limiting the stroke of the second of said racks in a position in which sufficient fuel is supplied for idling, and means for shifting the first of said racks to a position in which it interrupts the fuel supply.

5. In a vehicle, the combination of a crude oil engine of the multi-cylinder type, a vacuum-actuated brake system, means for temporarily connecting the same with a predetermined number of the cylinders for evacuating the brake system by means of such engine cylinders, a fuel pump for introducing the fuel into the cylinders, and a regulating mechanism for said fuel pump operable to adjust the fuel supply from said pump to the cylinders not connected with the brake system to keep the engine idling, and to interrupt the fuel supply from said pump to those cylinders with which the brake system is connected.

6. In a vehicle, the combination of a crude oil engine of the multi-cylinder type, a vacuum-actuated brake system, means for temporarily connecting the same with certain of the cylinders of said engine, means for throttling the air flow to said cylinders, a fuel pump for introducing the fuel into the cylinders, and a regulating mechanism for said fuel pump operable to adjust the fuel supply from said pump to the cylinders not connected with the brake system for idling, and to interrupt the fuel supply from said pump to the cylinders which are connected with the brake system.

7. In a vehicle, the combination of a crude oil engine of the multi-cylinder type, a vacuum-actuated brake system, a suction manifold divided into two compartments, a throttling valve disposed in one of said compartments and adapted to close the same, a conduit between the last mentioned compartment and the brake system, a fuel pump for introducing fuel into the engine cylinders, and a regulating mechanism for said fuel pump operative in such manner that from the one end position of the mechanism corresponding to the full load of the motor, to a certain intermediate position all cylinders are supplied with fuel but from this intermediate position to the other end position of the mechanism, corresponding to the idling position of the motor, the fuel supply is interrupted to those cylinders which are connected with the closable compartment.

8. In a vehicle, the combination of a crude oil engine of the multi-cylinder type, a fuel pump for supplying fuel to the cylinders, and a regulating mechanism for said fuel pump comprising two spring-connected movable elements, operative at times to regulate a section of said pump, and means for limiting the stroke of one of said elements in a position in which the associated part of the pump supplies the corresponding cylinders with sufficient fuel to keep the engine idling, and means for shifting the other of said elements to a position in which the supply of fuel from the other pump section associated therewith, to the corresponding other cylinders, is interrupted.

9. In a vehicle, the combination of a crude oil engine of the multi-cylinder type, a suction manifold for some but not all of the cylinders, a throttling valve operable to close said manifold, a vacuum brake system connected with said manifold, a pedal for controlling the braking, linkage movably connected with said pedal for operating said throttle valve, said linkage being so arranged that said pedal can be depressed only after said linkage has been moved for a definite distance to close the throttle valve.

10. The structure as set forth in claim 9 in combination with means for interrupting the fuel supply to those cylinders which are connected with said suction manifold.

11. In a vehicle, the combination of a crude oil engine of the multi-cylinder type, a suction manifold for certain of the cylinders, a throttle valve operable to close said manifold, a brake system connected with said manifold, a brake pedal for actuating the brake system, a second pedal movably connected with the first mentioned pedal and so arranged that the second pedal must first be depressed a definite distance before the first pedal can be depressed, means for connecting the second pedal with the throttle valve, a fuel pump for introducing the fuel into the cylinders, a regulating mechanism for said fuel pump, including two yieldingly connected movable elements, one of which controls the fuel supply from one section of the pump to the cylinders which do not evacuate the brake system, and the other of which controls the fuel supply from the other section of the pump to the cylinders which evacuate the brake system, means for limiting the throw of the first of said elements in a position in which sufficient fuel is supplied for idling, and means for moving the second of said elements to interrupt the fuel supply from the associated pump section.

12. The structure as set forth in claim 11, in combination with a third pedal connected with said regulating mechanism.

13. In a vehicle, the combination of a crude oil engine of the multi-cylinder type, a suction manifold for some but not all of the cylinders, a throttling valve operable to close said manifold, a vacuum brake system connected with said manifold, a pedal for controlling the braking, linkage movably connected with said pedal for operating said throttle valve, said linkage being so arranged that it is actuated to close said valve before said pedal becomes effective upon said brake system.

14. In a vehicle, the combination of a crude oil engine of the multi-cylinder type, a suction manifold for the motor which normally is in substantially unthrottled connection with the atmosphere, a throttling element in the manifold whereby the supply of air to some but not all of the cylinders may be throttled, a vacuum-operated brake system, a connection between such brake system and the section of the suction manifold to be throttled by said throttling element, a shut-off element disposed in said connection and adapted to close the same, a common operating mechanism for said shut-off mechanism and said throttling element, whereby said operating mechanism, upon being actuated, brings first the throttling element into throttling position and then opens said shut-off element to establish connection between said brake system with said suction manifold.

15. In a vehicle, the structure as set forth in claim 14 in combination with a fuel pump for introducing the fuel into the cylinders, a regulating mechanism for said fuel pump, and an operating mechanism for said regulating mechanism movable to cause the latter to interrupt the fuel supply to the cylinders to which the air supply can be throttled by said throttling element.

16. In a vehicle, the combination of a crude oil motor of the multi-cylinder type, a suction manifold for the motor, a throttling element in said manifold whereby the supply of air to certain of said cylinders may be throttled, a vacuum-operated mechanism adapted to be connected with the portion of the manifold controlled by said throttling element, a fuel pump for introducing fuel into the cylinders, a regulating mechanism for said pump operative in one of its end positions to adjust for idling the fuel feed from the pump to the cylinders whose air supply remains unthrottled, and to interrupt completely the feed of fuel to the remaining cylinders whose air supply is throttled.

In testimony whereof I affix my signature.

FERDINAND PORSCHE.